United States Patent
Zyuzin et al.

(10) Patent No.: US 8,548,241 B2
(45) Date of Patent: Oct. 1, 2013

(54) ENHANCED MULTILAYER COMPRESSION OF IMAGE FILES USING OCR SYSTEMS

(75) Inventors: German Zyuzin, Moscow (RU); Maksim Pikhenko, Moscow (RU); Vyacheslav Sapronenko, Moscow (RU)

(73) Assignee: ABBYY Development LLC, Moscow (RU)

( * ) Notice: Subject to any disclaimer, the term of this patent is extended or adjusted under 35 U.S.C. 154(b) by 0 days.

(21) Appl. No.: 13/545,917

(22) Filed: Jul. 10, 2012

(65) Prior Publication Data

US 2012/0294524 A1 Nov. 22, 2012

Related U.S. Application Data

(63) Continuation of application No. 12/211,746, filed on Sep. 16, 2008, now Pat. No. 8,218,887.

(60) Provisional application No. 60/976,354, filed on Sep. 28, 2007.

(51) Int. Cl.
*G06K 9/34* (2006.01)
*G06K 9/46* (2006.01)

(52) U.S. Cl.
USPC .......................................... 382/173; 382/243

(58) Field of Classification Search
USPC ................. 382/162, 164, 166, 173, 174, 232, 382/235, 243, 244, 248, 282; 358/426.01
See application file for complete search history.

(56) References Cited

U.S. PATENT DOCUMENTS

| | | | |
|---|---|---|---|
| 5,727,112 A | 3/1998 | Kellar et al. |
| 5,778,092 A | 7/1998 | MacLeod et al. |
| 6,058,214 A | 5/2000 | Bottou et al. |
| 6,832,007 B1 | 12/2004 | Zhang et al. |
| 6,859,204 B2 | 2/2005 | Curry et al. |
| 6,987,882 B2 | 1/2006 | Curry et al. |
| 7,031,518 B2 | 4/2006 | Curry et al. |
| 7,110,137 B2 | 9/2006 | Burgess et al. |
| 7,139,433 B2 | 11/2006 | Li |
| 7,308,136 B2 | 12/2007 | Curry et al. |
| 7,376,266 B2 | 5/2008 | Simard et al. |
| 7,376,272 B2 | 5/2008 | Fan et al. |
| 7,379,593 B2 | 5/2008 | Fan et al. |
| 7,382,489 B2 | 6/2008 | Curry et al. |

OTHER PUBLICATIONS

L. Bottou et al., "Efficient Conversion of Digital Documents to Multilayer Raster Formats", IEEE, pp. 444-448, 2001.

*Primary Examiner* — Duy M Dang
(74) *Attorney, Agent, or Firm* — LeighAnn Weiland; Aditya Krishnan

(57) ABSTRACT

Described herein is a method for segmenting a document image into a picture component, a special or significant picture component, and a non-picture component. The non-picture component is compressed and may include character blocks. Separately, picture components are compressed with a lossy algorithm or with a preliminary defined compression ratio. Subsequently, the compressed picture component, significant picture component and the compressed non-picture component are saved in memory or in a storage location so that the document image may be recomposed based on the compressed picture component or compressed significant picture component and the compressed non-picture component.

28 Claims, 6 Drawing Sheets

ENHANCED MULTILAYER COMPRESSION OF IMAGE FILES USING OCR SYSTEMS

CROSS-REFERENCE TO RELATED APPLICATIONS

For purposes of the USPTO extra-statutory requirements, the present application constitutes a continuation-in-part of U.S. patent application Ser. No. 12/211,746, filed on 16 Sep. 2008, which is currently co-pending, or is an application of which a currently co-pending application is entitled to the benefit of the filing date.

The United States Patent Office (USPTO) has published a notice effectively stating that the USPTO's computer programs require that patent applicants reference both a serial number and indicate whether an application is a continuation or continuation-in-part. See Stephen G. Kunin, Benefit of Prior-Filed Application, USPTO Official Gazette 18 Mar. 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

FIELD

Embodiments of the present invention relate to an implementation of a method and system for processing document images and compressing document images.

BACKGROUND

Optical character recognition (OCR) systems are used to transform images or representations of paper documents, for example document files in the Portable Document Format (PDF), into computer-readable and computer-editable and searchable electronic files. A typical OCR system consists of an imaging device that produces the image of a document and software that runs on a computer that processes the images. As a rule, this software includes an OCR program, which can recognize symbols, letters, characters, digits, and other units and save them into a computer-editable format—an encoded format.

However, apart from text, a document image may contain pictures, which lose their quality if saved together with the text using traditional methods. If lossless methods are used to save the pictures, the size of the resulting file typically becomes unacceptably large. To avoid this dilemma, a multilayer compression method is sometimes used and is known as the Mixed Raster Content (MRC) method. The MRC method uses three layers of compression so that one algorithm is used to compress the background, another algorithm is used to compress the chromatic units, and still another method may be used to compress the monochrome mask. This method will in most cases yield files of acceptable size. However, sometimes a user may need certain important elements, including, among other, pictures and photos, to be saved without any noticeable loss in quality.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings. Throughout, like numerals generally refer to like parts with the first digit of each numeral generally referring to the figure which first illustrates the particular part.

DETAILED DESCRIPTION

Embodiments of the invention disclose a method to efficiently reduce the size of electronic "image only" and "searchable" document-type files, while at the same time maintaining a high visual quality of the document. For example this method can be used for reducing the size of Portable Document Format (PDF) and other types of files.

The method includes the following general, broad steps:

segmenting a document image into a picture component and a non-picture component;

compressing the non-picture component;

compressing picture components such as with a preliminary defined compression ratio; and saving the compressed picture component and the compressed non-picture component in memory (or in a storage location) so that the document image may be recomposed to form a recomposed image based on the compressed picture component and the compressed non-picture component.

The method may be implemented by a system which includes a computer with optical character recognition (OCR) software programmed with instructions to perform the method. When a paper document is scanned, captured electronically or photographed, a document which contains text printed in several font types, several different blocks or areas of text, tables, blocks, areas of text in different colors, pictures, photos, etc., the OCR system analyzes and classifies each block or area as containing pictures or photos, or text printed in a particular font type and color.

In one implementation, the method is based on analyzing a chromaticity of the image content. The method may be also based on analyzing a geometrical form or size of objects in the image. Other properties of image content may be analyzed, too.

Based on a chromaticity change, images may be classified into several categories that correspond to images with one or more of the following characteristics: pictures, images or photos where chromaticity changes smoothly and gradually from a dark color to a light color, images including text and tables where chromaticity changes in discrete blocks, images without a smooth transition between light and dark areas, images including textural areas where chromaticity changes smoothly and the changes are small, images including frames and diagrams, which are areas with simple geometrical form and a monochrome or gradient filling.

Figure 1:
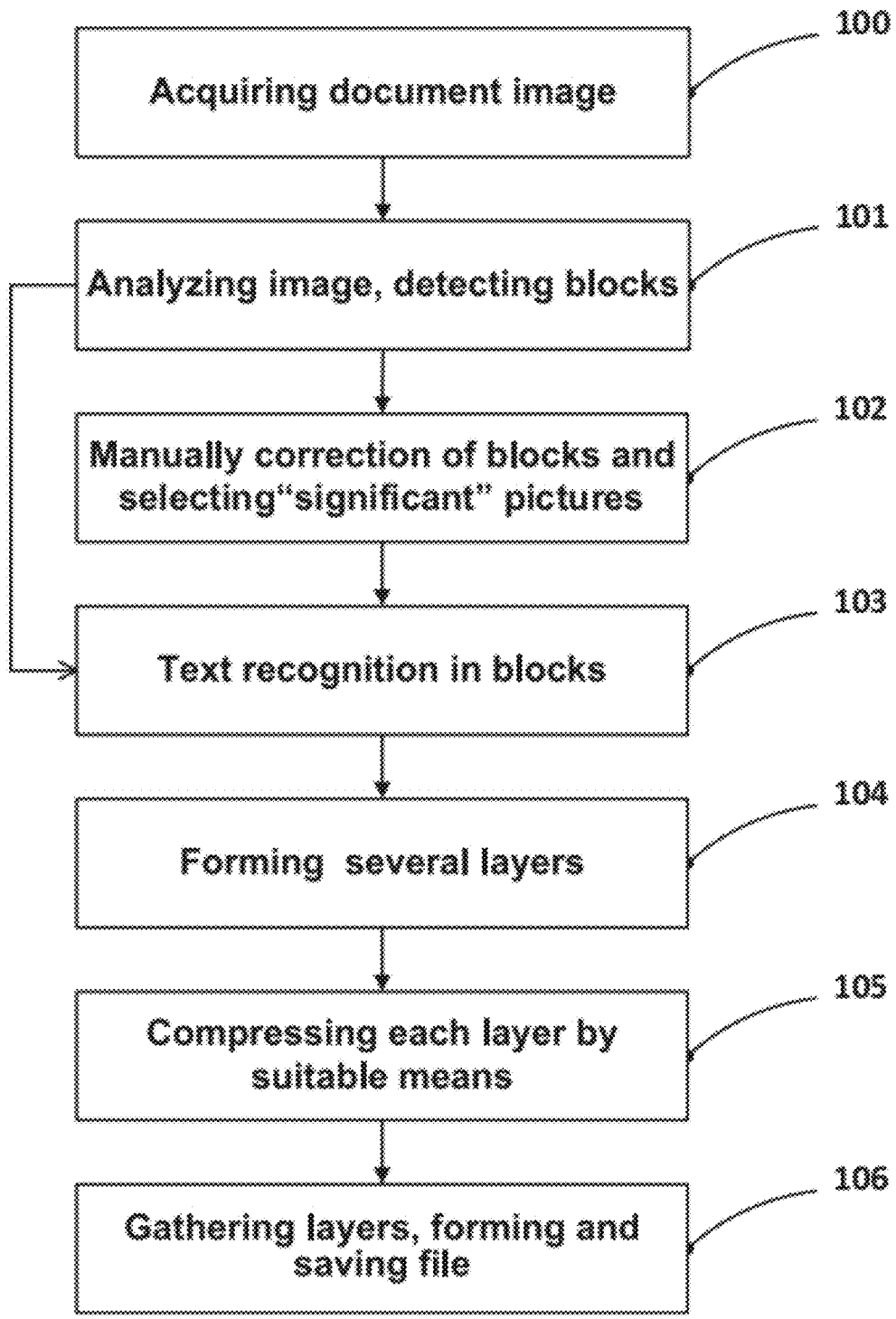
FIG. 1 shows a flowchart for an exemplary method of compressing a document in accordance with one embodiment of the invention.

In one embodiment, different export modes for exporting "significant" pictures and all other image elements are used. FIG. 1 of the drawings shows an image processing diagram or flowchart. Referring to FIG. 1, at step 100 a document image is acquired, e.g., from an imaging device, camera, scanner, smartphone. At step 101, the image is analyzed and different blocks and areas are detected in the image. A block may comprise text, picture, frame, etc.

At step 102, identified objects (pictures, text blocks, etc.) may be corrected manually. For example, in another embodiment a user may manually (through a user interface element or mechanism) correct the location of detected blocks or specify the "significant" pictures within the image of the document and select a compression ratio for the pictures of the document or the significant pictures so that these significant pictures may be saved uncompressed or with less or no loss in fidelity as compared to an original image. So if information associated with a picture or picture block is not important, it can be excluded from being considered as a significant picture and can be compressed using a lossy compression.

Compression of significant pictures is preferably performed without loss of quality (i.e., lossless compression such as a version of a Lempel-Ziv-Welch encoding (LZW). Compression may be also carried out with a compression ratio so that the compressed picture is visually indistinguishable from original one. The coefficient of compression (compression ratio) of pictures may be also specified manually by a user such as through a user interface element of a configuration or other computer program.

At step 103, the text in textual blocks is or may be recognized by means of OCR. At step 104, the image (such as the one shown as 200 in FIG. 2) is preferably divided into several layers.

Figure 2:
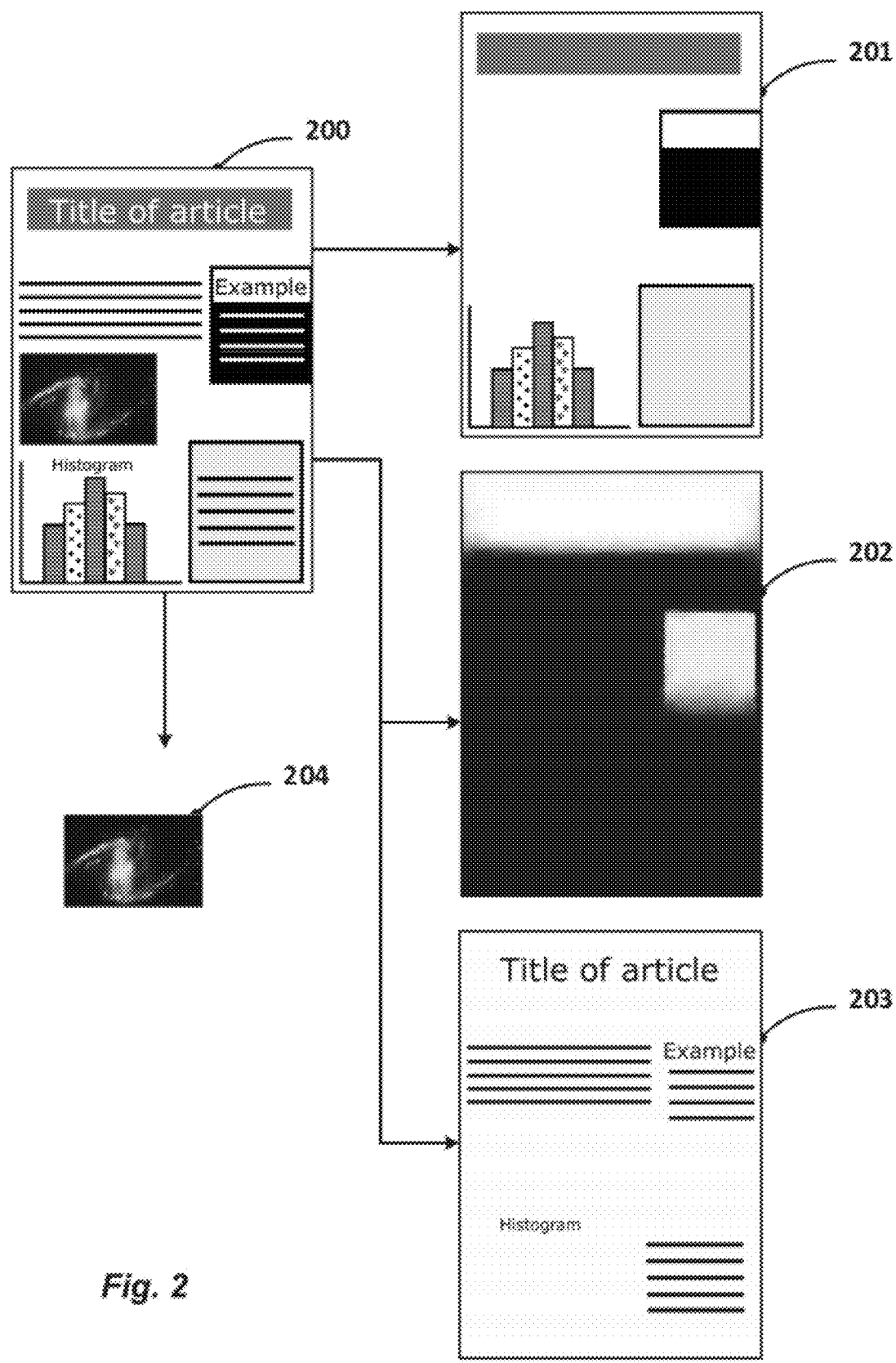
FIG. 2 is an illustration of layers of an image of a document in accordance with one embodiment of the invention.

FIG. 2 is an illustration of the separation of an image into layers in accordance with one embodiment of the invention. Dividing into layers includes removing or separating onto a separate layer, where the significant pictures are removed or cut-out for inclusion in a separate layer (204), and includes separating blocks comprising text, tables, and other units of the image where chromaticity changes in discrete blocks. Such blocks are separated into or onto two layers: a monochrome layer 203 and a chromatic layer 202). FIG. 2 illustrates four layers, in accordance with one embodiment of the invention. Other numbers of layers may be used. Three of the four layers comprise a background layer 201, a chromatic layer 202, and a third layer 203 representing a monochrome mask. The fourth layer 204 includes significant pictures that were effectively removed, designated or set aside onto a separate layer for separate treatment. If there is no significant picture in the image, the image will be separated into three layers and separate treatment and processing of a significant picture is not needed.

Figure 3:
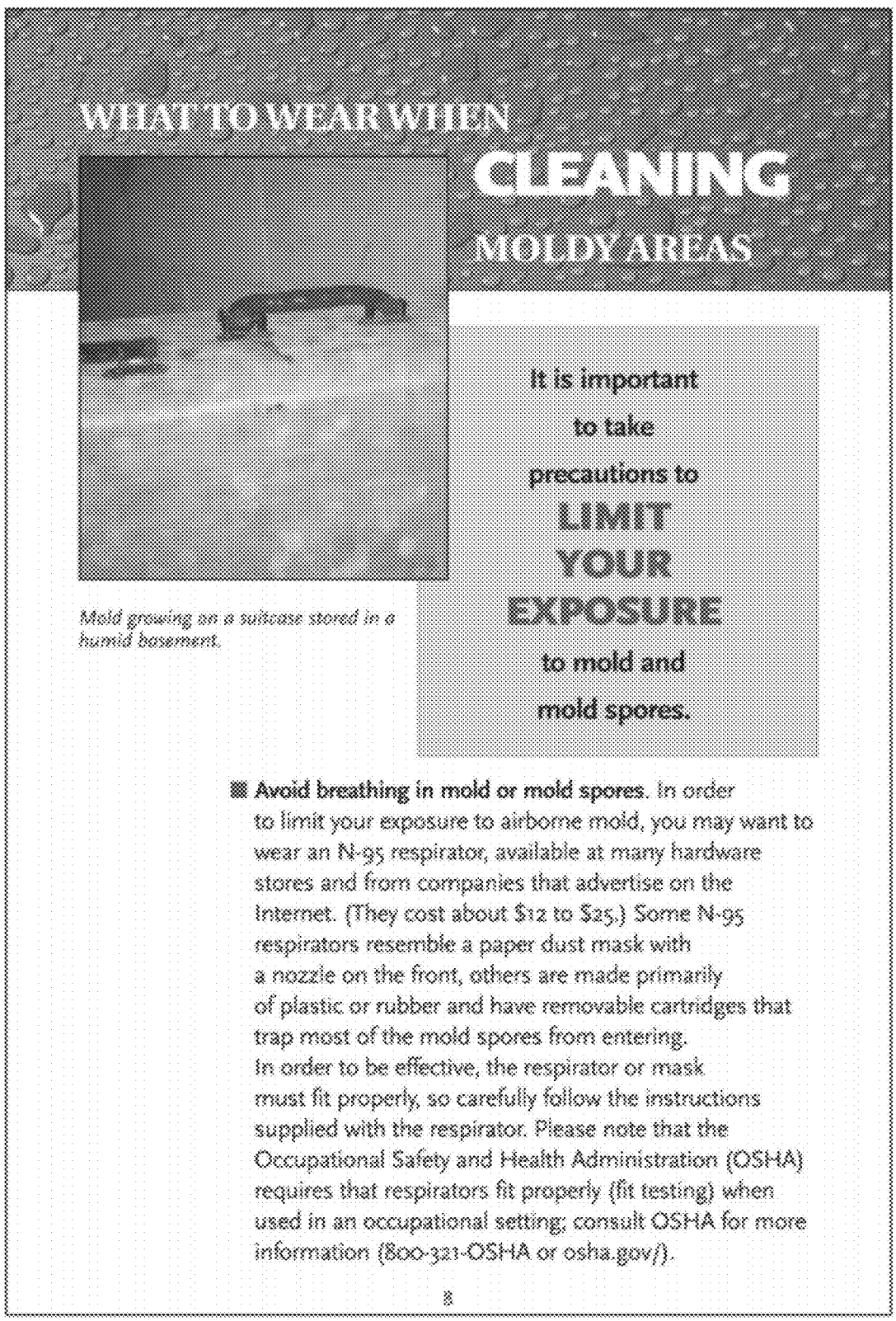
FIG. 3 shows an example of a document image on which the method of the invention can be used.

FIG. 3 shows an example of an image of a document for which the method of the invention can be used. The image is characterized by presence of pictures which may be considered, apart from the text blocks, as "significant."

Figure 4A:
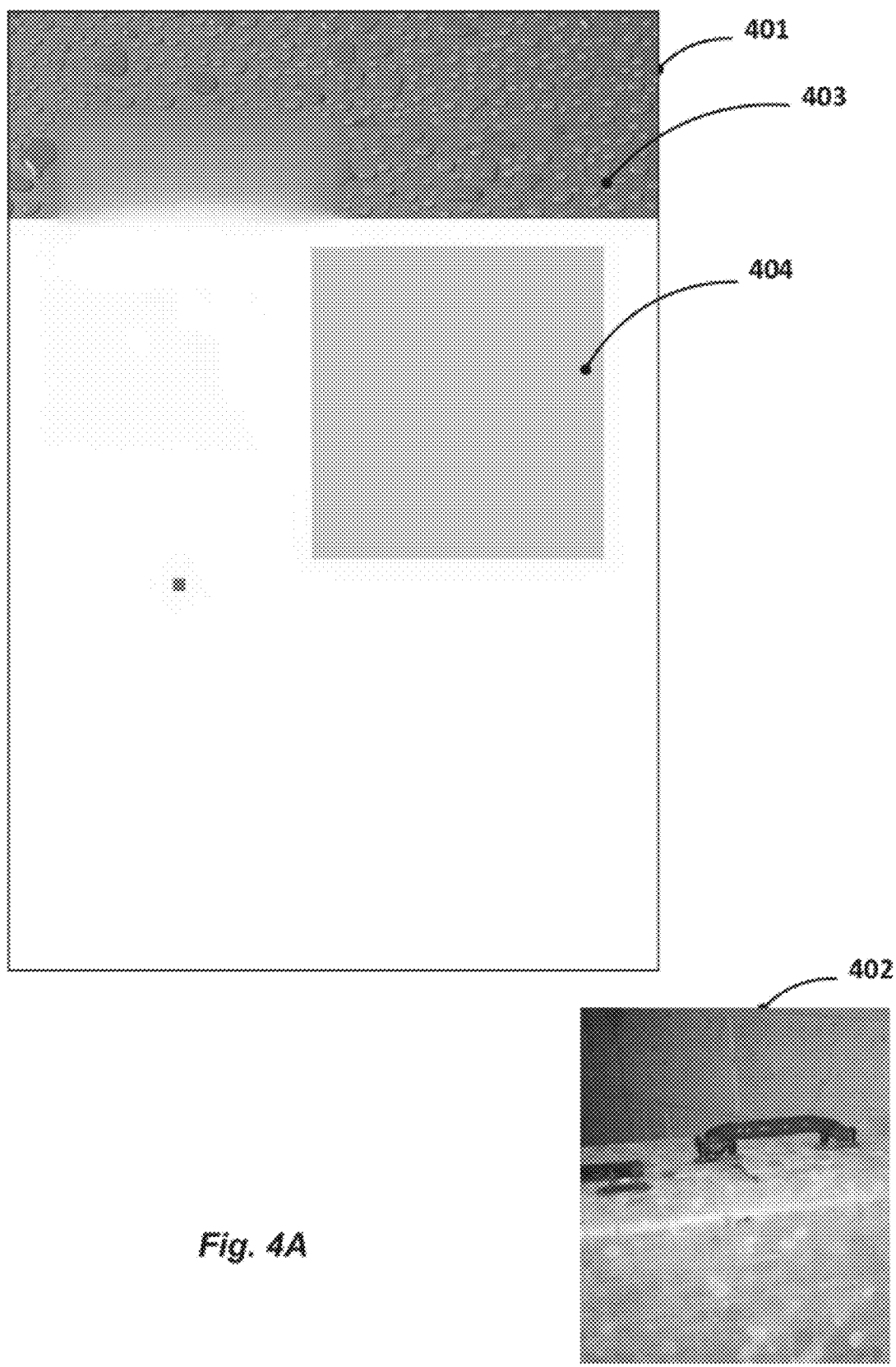
FIG. 4A shows components or processed components of the exemplary document image of FIG. 3.
Figure 4B:
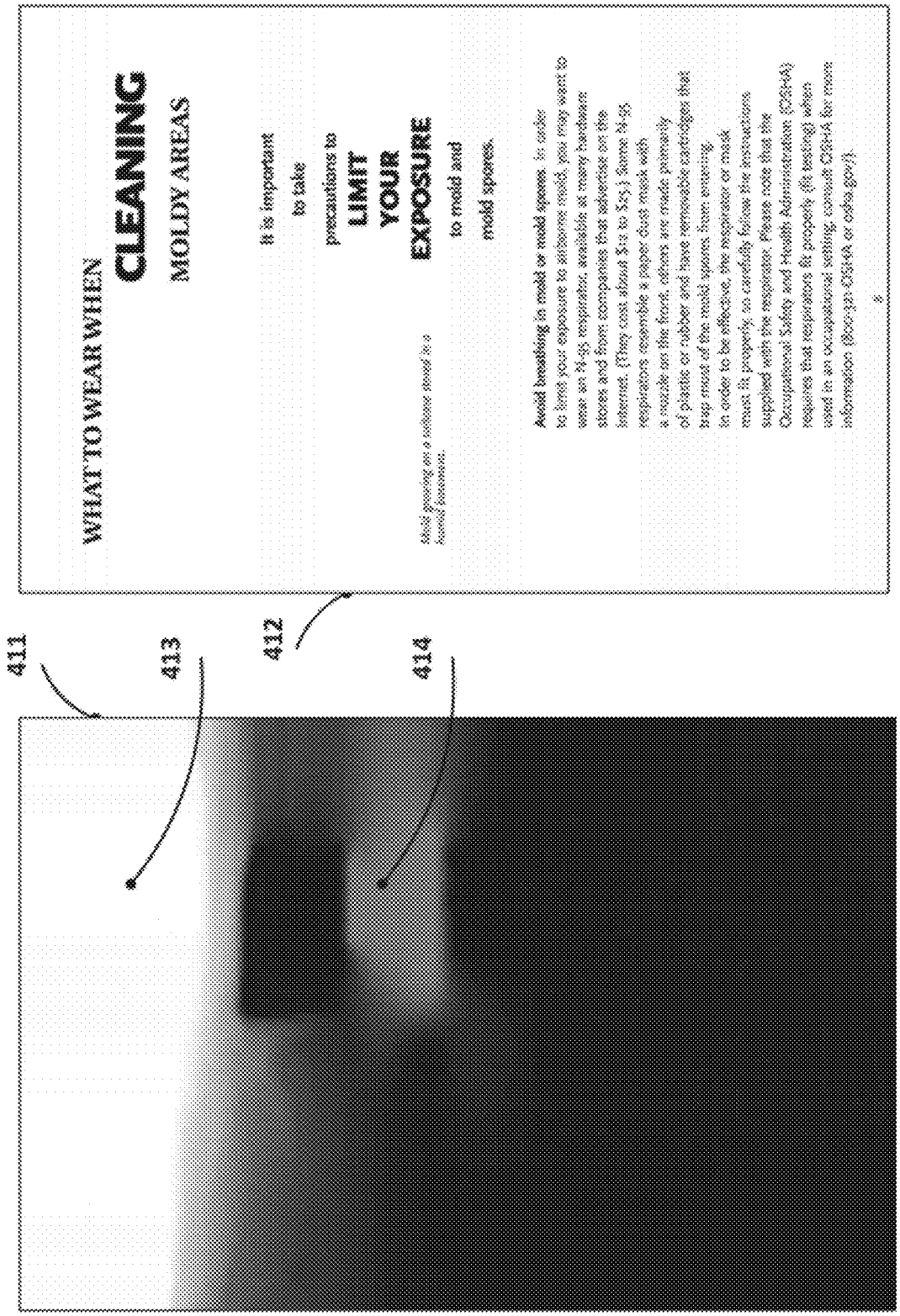
FIG. 4B shows components or processed components of the exemplary document image of FIG. 3.

FIG. 4A and FIG. 4B show how the image of FIG. 3 may be separated, processed or decomposed into layers in accordance with the techniques disclosed herein. FIG. 4A shows a background 401, and a "significant" picture 402. FIG. 4B shows examples of a chromatic layer 411, and a monochrome mask 412 that may be used to reconstruct the text in the image of FIG. 3 in the original colors.

In a case where vectorization of objects in a background layer is used, the background layer 401 may be represented as a white page (rectangle), one-color rectangle 403 and/or the rectangle with a complicated or complex color filling 404. The one-color rectangle 403 may be vectorized and the rectangle 404 may be compressed, for example, by means of an algorithm that complies with the Joint Photographic Experts Group (JPEG) or JPEG 2000 standard.

In accordance with one embodiment, the background layer 201 may be obtained as a result of substitution of a text color, a color of separators or other objects in the document image where chromaticity changes in discrete blocks (abruptly), for the color of the background. Thus, a color image with smooth color blends or transitions is obtained. The presence of a texture or watermark is permissible. Thereby the background layer becomes smoother and more even or uniform across one or more portions of the document image. Consequently, compression of a background layer is more qualitative.

For painting (filling) unknown regions of a background layer, for example an area of a text or other objects removed into a separated layer, information about the color around the unknown regions may be used. In one embodiment, a background image or its part is reduced recursively using only information about the color of known pixels. This action simultaneously reduces a mask of known pixels and computes fill colors of unknown pixels in a reduced image at least in part based on information about colors of surrounding known pixels. The process of reducing or compressing (in size, quality, or other metric) the background image and computing a color of unknown pixels is recursively performed until colors of all unknown pixels are computed. Then, recursive expansion of the reduced image and filling unknown pixels based on calculated values of color is performed. During expansion of the reduced image, a bilinear or other type of filtering may be used, then adjustments of the color of known pixels may be performed.

The background layer also may be constructed by filling the layer with one preset color. The background is generally considered the least important of all elements to a user or reader of a document, and the background may be compressed using a lossy compression method, such as an implementation of an algorithm that complies with the JPEG or JPEG 2000 standard. The user may select a compression ratio for the background as well.

In another embodiment, a background layer is constructed to include only a background color for each block in an image. For the majority of magazines, newspapers, booklets and books, during page makeup, a white (or a monochrome light-colored) background is used for corresponding text columns, frames (or plates) with a color fill under such elements as text (e.g. under titles), incuts (or insets) with text, tables, pictures, plots, diagrams, etc. Color frames and incuts with text usually have a simple or rectangular shape and a single-color fill. The method may also be used with a rarer gradient fill under color frames and incuts. Detection of similar objects (areas) in a single-color (usually white) background allows not only the reduction of the size of the file through the use of compression but the method also significantly improves a visual quality of each document so processed.

Each block may be represented on the background layer 201 as a color rectangle or another simple geometric configuration, for example, with smooth color transitions, possibly with a texture, gradient, watermark, etc. In other words, a page or a part of page may be represented by some set of areas using several colors. If some part of a page contains an area with a complex color background, this area can be compressed in a way described above using a lossy compression.

To represent a document page as a set of simple colored areas on a monochrome background, the presence of such areas, their boundaries and filling color or colors should be reliably detected.

Text, tables, separators, and significant pictures are detected during analysis of an image. These objects may be cut out from the image so that only a background remains. Each background or background portion is analyzed for the presence of simple background objects (e.g., frames, diagrams, incuts) and one-color areas. For instance, such analysis may apply different types of filtering for various noise elimination and averaging out color non-uniformity owing to offset printing. To appreciate an area as monochrome, it should be admitted a negligible error in color when comparing the resulting color with the color of adjacent areas.

In one implementation, after filtration and identification of one-color areas or areas with simple color compatibilities on a background layer, gradient transitions between two colors are searched and identified. One should take into account possible noise emergence and the presence of shadows or glares when color analysis of a background is performed. If the method reliably detects that the background layer is composed of a few number of colors, compression of this layer by a relatively small palette of an appropriate set of colors may be used. Any appropriate method may be used to compress this layer, e.g., ZIP or PNG compression. If areas with complex color contents are detected on the background layer, they may be compressed separately within the enclosing rectangle using, for example an algorithm implementing a JPEG or JPEG 2000 compression standard.

In another implementation, after filtering for and identifying in the background layer areas of simple geometric shapes where a linear dimension is greater than a certain value, such areas can be easily vectorized. For such detected areas, at least one filling color is computed.

In the process of vectorization, the graphic information from a raster image or its part is converted into a vector image. In the vector image, objects are described based on the simple geometric shapes (e.g., points, lines, circles). For example, for a straight line to be drawn, only coordinates of an initial point, endpoint, line width, and color of a straight line should be specified. For building a polygon, coordinates of vertices, fill color, and color of outline (if required) should be assigned. As a result of vectorization, the image may be scaled without loss of quality. Thus, the vectorized image at smaller file size possesses significantly improved visual quality in comparison to a raster image.

Thereby some objects, such as frames, charts, tables, graphs, etc. may be identified and vectorized in the background layer. Separators may be vectorized too, or they may be left in one layer such as with a portion or section of text. As a result, vectorized objects in a background layer may be removed to a separate layer as if the background layer is divided into two sub-layers.

In one embodiment, the chromatic layer 202 is constructed by filling areas around characters with a color of the text. In this case, such filling is done by performing a calculation of color pixels for each unknown region and filling it in a recursive manner in the same way as painting of unknown regions in the background layer.

In another embodiment, the chromatic layer 202 may be constructed by substituting a spatially corresponding rectangle for each character (i.e., letter or symbol) in the image being processed, the rectangle being of the same color as of the character. Moreover, each rectangle is of such a size so as to be able to hold the corresponding character.

With reference to FIG. 4B, the main color of chromatic layer 411 may be black because the main color of the text is black, and the "inverted" title characters are represented by a white color area in the chromatic layer 413. In an exemplary embodiment, there is also a blue color area 414, which represents a blue title of an incut in the original image. In another embodiment, if the color of a character cannot be detected, the rectangle is given the color of its environment, e.g., the most frequently occurring color of the characters in the string. Any method may be used to compress this chromatic layer 411, e.g. ZIP or LZW compression. Thus, the color corresponding to a text and separators in the chromatic layer is being filled out the areas around characters. Therefore, under superimposition, application of a text mask on the chromatic layer results in the characters finding themselves on an area of color corresponding to their original color.

A monochrome mask 203 may be constructed based on textual blocks identified at step 101 and recognized at step 103. A binarized monochrome (textual) mask is created from recognized characters. That is, all characters and separators are black, regardless of their color in the original image, the others areas become white. The layer 203 represents a monochrome mask whose units (e.g., pixels) only may be "0" and "1." The monochrome mask acts as a switch to control when a pixel in the recomposed image will be rendered based on the background and chromatic layers. In one embodiment, a "1" is a black pixel which corresponds to a pixel of any color when rendered on or in conjunction with the chromatic layer 202, whereas a "0" is a white pixel which corresponds to a pixel of any color rendered on or in conjunction with the background layer 201.

FIG. 4B represents an example of a monochrome mask 412 for the image of FIG. 3. Any method suitable for processing and compressing binary files may be used for compressing the monochrome mask of FIG. 4B, e.g., JBIG2 or CCITT4 FAX compression.

An image that represents the text of the source page in the original colors is obtained by overlaying or applying text masks to a corresponding chromatic layer. Moreover, this process works not only with one-color characters, but with characters with a gradient fill.

Referring to FIG. 1, at step 105 to reduce an output file size, each obtained layer of the image is compressed by means or algorithms which are appropriate for one or more characteristics of the respective layer.

Referring to FIG. 1, at step 106, a file is formed and stored in memory. The file structure is formed in such a manner that the background 201 is exported first. Then, the result of superimposing the monochrome mask 203 on the chromatic layer 202 is placed over the background 201. Finally, the significant pictures 204 are exported and placed over all said layers.

A significant advantage of the disclosed method over known methods is obtaining images that include text that exhibit a high visual quality and simultaneously having a generally high degree of compression.

Figure 5:
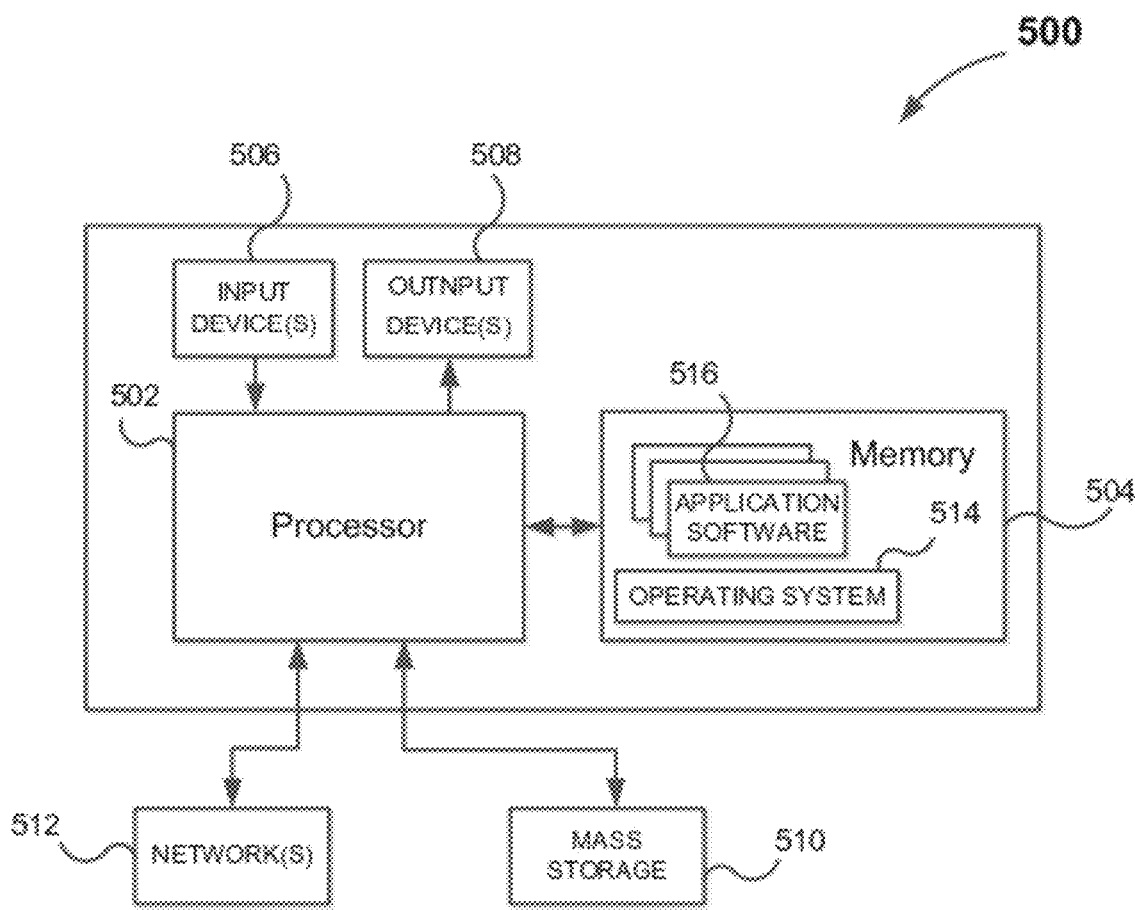
FIG. 5 shows a block diagram of an exemplary hardware for an OCR system to perform the methods and techniques described herein.

FIG. 5 of the drawings shows an example of hardware 500 that may be used to implement the data capture system, in accordance with one embodiment of the invention. The hardware 500 typically includes at least one processor 502 coupled to a memory 504. The processor 502 may represent one or more processors (e.g., microprocessors, graphics processing unit (GPU), central processing unit (CPU)), and the memory 504 may represent random access memory (RAM) devices comprising a main storage of the hardware 500, as well as any supplemental levels of memory e.g., cache memories, non-volatile or back-up memories (e.g. programmable or flash memories), read-only memories, etc. In addition, the memory 504 may be considered to include memory storage physically located elsewhere in the hardware 500, e.g., any cache memory in the processor 502 as well as any storage capacity used as a virtual memory, e.g., as stored on a mass storage device 510.

The hardware 500 also typically receives a number of inputs and outputs for communicating information externally. For interface with a user or operator, the hardware 500 may include one or more user input devices 506 (e.g., a keyboard, a mouse, imaging device, scanner, etc.) and a one or more output devices 508 (e.g., a Liquid Crystal Display (LCD) panel, a sound playback device (speaker)).

For additional storage, the hardware 500 may also include one or more mass storage devices 510, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 500 may include an interface with one or more networks 512 (e.g., a local area network (LAN), a wide area network (WAN), a wireless network, and/or the Internet among others) to permit the communication of information with other computers coupled to the networks. It should be appreciated that the hardware 500 typically includes suitable analog and/or digital interfaces between the processor 502 and each of the components 504, 506, 508, and 512 as is well known in the art.

The hardware 500 operates under the control of an operating system 514, and executes various computer software applications, components, programs, objects, modules, etc. to implement the techniques described above. Moreover, various applications, components, programs, objects, etc., collectively indicated by reference 516 in FIG. 5, may also execute on one or more processors in another computer coupled to the hardware 500 via a network 512, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks, (DVDs), etc.), among others, and transmission type media such as digital and analog communication links.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

We claim:

1. A method for processing a document image, the method comprising:
    segmenting the document image into a picture component and a non-picture component;
    identifying a text block in the non-picture component, wherein the background layer includes a background color for the text block in the non-picture component;
    for the non-picture component constructing a background layer, a chromatic layer and a monochrome mask;
    compressing at least a portion of the non-picture component;
    saving at least one of the compressed non-picture component and the compressed picture component in memory; and
    forming a recomposed image based on at least one of the compressed picture component and the compressed non-picture component.

2. The method of claim 1, wherein the non-picture component includes characters.

3. The method of claim 1, wherein the monochrome mask acts as a switch to control when a pixel in the recomposed image would be rendered based on the background and chromatic layers.

4. The method of claim 1, wherein the compressing of the picture component is done based on a preliminary defined compression ratio.

5. The method of claim 1, wherein the compressing of the picture component includes a non-lossy compression algorithm.

6. The method of claim 1, wherein segmenting the document image into the picture component includes identifying each picture in the document image based on one or more chromaticity changes.

7. The method of claim 1, wherein the method further comprises performing optical character recognition on any text of the text block.

8. The method of claim 1, wherein constructing the background layer includes reducing a complexity of the background layer recursively using information about a color of known surrounding pixels to compute a fill color for respective unknown pixels.

9. The method of claim 1, wherein the compressing of at least the portion of the non-picture component is based on a background feature of the non-picture component.

10. The method of claim 1, wherein the method further comprises:
    compressing the picture component.

11. The method of claim 1, wherein said compressing the non-picture component includes vectorizing the background layer, wherein vectorizing includes use of a geometric shape.

12. The method of claim 1, wherein the background layer is constructed by applying vectorization of an object, wherein an object is represented as a composition of one or more geometric shapes.

13. The method of claim 1, wherein the chromatic layer is constructed by filling areas around one or more characters of the text block with a color derived from a respective character, wherein filling is performed by calculating one or more color pixels for each unknown region and filling the unknown region.

14. The method of claim 13, wherein filling the unknown region is performed in a recursive manner.

15. The method of claim 13, wherein the method further comprises:
compressing the background layer via use of a limited palette of detected colors.

16. The method of claim 1, wherein the method further comprises:
analyzing the background layer for a colored area, wherein the colored area includes one or more colors.

17. The method of claim 16, wherein analyzing the background layer includes detecting a shape of the said text block in the non-picture component.

18. The method of claim 16, wherein the colored area is vectorized.

19. The method of claim 1, wherein background layer or a portion of the background is compressed by a lossy compression method.

20. A system for processing an image of a document, the system comprising:
a processor; and
a memory coupled to the processor, the memory storing instructions which when executed by the processor cause the system to:
segment the image of the document into a picture component and a non-picture component;
from the non-picture component, constructing a background layer, a chromatic layer and a monochrome mask for the non-picture component;
identify a text block in the non-picture component; wherein the background layer includes a background color for the text block in the non-picture component;
compress the picture component;
compress the non-picture component based on a background feature of the non-picture component;
save at least one of the compressed non-picture component and the compressed picture component in memory; and
form a recomposed image based on at least the significant picture component and the compressed non-picture component.

21. The system of claim 20, wherein the non-picture component includes characters.

22. The system of claim 20, wherein the monochrome mask acts as a switch to control when a pixel in the recomposed image would be rendered based on the background and chromatic layers.

23. The system of claim 20, wherein the compressing of the picture component is done based on a preliminarily defined compression ratio.

24. The system of claim 20, wherein the compressing of the picture component involves a non-lossy compression algorithm.

25. The system of claim 20, wherein segmenting the document image into the picture component includes identifying each picture in the document image based on one or more chromaticity changes.

26. The system of claim 20, wherein the instructions further cause the system to:
perform optical character recognition on any characters identified in the non-picture component.

27. The system of claim 20, wherein constructing the background layer includes reducing a complexity of the background layer recursively using information about a color of known surrounding pixels to compute a fill color for respective unknown pixels.

28. The system of claim 20, wherein the background layer includes a background color for the identified text block.

* * * * *